US006285983B1

United States Patent
Jenkins

(10) Patent No.: US 6,285,983 B1
(45) Date of Patent: Sep. 4, 2001

(54) MARKETING SYSTEMS AND METHODS THAT PRESERVE CONSUMER PRIVACY

(75) Inventor: Elwyn D. Jenkins, Atlanta, GA (US)

(73) Assignee: Lend Lease Corporation Ltd., Atlanta, GA (US)

(*) Notice: Subject to any disclaimer, the term of this patent is extended or adjusted under 35 U.S.C. 154(b) by 0 days.

(21) Appl. No.: 09/272,123

(22) Filed: Mar. 19, 1999

Related U.S. Application Data

(60) Provisional application No. 60/105,063, filed on Oct. 21, 1998.

(51) Int. Cl.[7] .................................. G06F 17/60
(52) U.S. Cl. .................................. 705/10; 705/14
(58) Field of Search ..................... 705/7, 10, 14

(56) References Cited

U.S. PATENT DOCUMENTS

| | | | |
|---|---|---|---|
| 5,724,521 | | 3/1998 | Dedrick . |
| 5,754,939 | | 5/1998 | Herz et al. . |
| 5,774,868 | * | 6/1998 | Cragun et al. ............ 705/10 |
| 5,848,396 | * | 12/1998 | Gerace ....................... 705/10 |
| 5,930,764 | * | 7/1999 | Melchione et al. ......... 705/10 |
| 5,933,811 | * | 8/1999 | Angles et al. .............. 705/14 |
| 5,956,693 | * | 9/1999 | Geerlings ................... 705/14 |
| 5,966,695 | * | 10/1999 | Melchione et al. ......... 705/10 |
| 5,991,735 | * | 11/1999 | Gerace ....................... 705/10 |
| 5,995,943 | * | 11/1999 | Bull et al. .................. 705/14 |
| 6,055,510 | * | 4/2000 | Henrick et al. ............ 705/14 |
| 6,073,112 | * | 6/2000 | Geerlings ................... 705/14 |
| 6,182,050 | * | 1/2001 | Ballard ....................... 705/14 |

FOREIGN PATENT DOCUMENTS

| | | |
|---|---|---|
| 5528294 | 9/1994 | (AU) . |
| 0939377A2 | 9/1999 | (EP) . |
| WO98/49642 | 11/1998 | (WO) . |
| WO99/01018 | 1/1999 | (WO) . |
| WO99/22328 | 5/1999 | (WO) . |

OTHER PUBLICATIONS

Cameron, "The Vignette V/5 Relationship Marketing Server: Product Overview," Vignette Corporation, Jul. 25, 2000, 14 pp.*

Business Wire, "Acxiom Data Network Revolutionizes On–Line Data Technology," Feb. 24, 1998, 2 pages.*

PRNewswire, "Blau Technologies and IBM Form Technology Partnership to Jump Start Electronic Commerce," Dec. 11, 1996, 2 pages.*

H. Wang et al.; Consumer Privacy Concerns About Internet Marketing; Mar. 1, 1998; pp. 63–70; vol. 41, No. 3; Communications of the Association for Computer Machinery, U.S., Association for Computing Machinery, New York.

* cited by examiner

*Primary Examiner*—Stephen Gravini
*Assistant Examiner*—Marc Norman
(74) *Attorney, Agent, or Firm*—Alston & Bird LLP

(57) ABSTRACT

Real-time marketing systems and methods are provided for creating marketing profiles and for directing customized offers to consumers while preserving consumer privacy. The systems and methods permit marketers to communicate offers directly to consumers without marketer knowledge of consumer identity. The systems and methods abstract from consumer profile records and securely index the class records created thereby to individual consumers. Without knowledge of consumer identity, marketers can frame real-time offers according to a marketing profile describing elements of the class records and then direct those offers to individual consumers.

37 Claims, 3 Drawing Sheets

MARKETING SYSTEMS AND METHODS THAT PRESERVE CONSUMER PRIVACY

CROSS-REFERENCE TO RELATED APPLICATIONS

This application claims the benefit, under Title 35, United States Code, Sec. 119(e), of U.S. provisional patent Application No. 60/105,063, filed Oct. 21, 1998, titled MARKETING SYSTEMS AND METHODS.

FIELD OF THE INVENTION

The present invention generally relates to product and service marketing and, more particularly, to on-line consumer marketing.

BACKGROUND OF THE INVENTION

Marketers have long made use of data on spending habits, demographics, behavior patterns and other information regarding consumers in order to guide the marketing of financial products, consumer packaged goods, pharmaceuticals, and other products and services. Direct marketing efforts targeted at individual consumers have become more and more common as marketers leverage the growing wealth of individual consumer data available. Growing use of credit cards and the emergence of electronic commerce and the Internet have expanded the amount of consumer information available in electronic form. Data-driven marketing in general and direct marketing in particular have increasingly taken advantage of expanded electronic marketing data On-line marketing activity has grown rapidly as Internet-based communications has expanded. Such on-line marketing activity includes, for example, offerings directed to individuals through e-mail accounts and the use of web browser cookie files to target web page banner ads. As is known in the art, cookie files may be installed by a web site server on the computer hard disk drive of a browsing consumer. Cookie files typically include information indicating that the browser has visited that web site.

Businesses are increasingly utilizing a combination of marketing information such as consumer lists, demographic profiles and customer segmentation to learn more about who their customers are, what new products they may wish to purchase, how to best maintain their existing customer base, and how to entice new customers. Some businesses seek to integrate both external and internal customer data with a heavy emphasis on consumer behavioral data. The phenomenal growth of the Internet has spawned a new area of interest. As the number of Internet users, and more specifically the number of Internet shoppers, increases, the demand for Internet market information and online purchase behavior has boomed.

Database analysis tools enable marketers to test hypotheses regarding consumer behavior across large consumer data sets. For example, a conventional database analysis can test the hypothesis that consumers living in the 30338 area code are more likely to make a major furniture purchase within six months of buying a new car. Data mining tools, on the other hand, enable marketers to learn about consumer behavior by applying sophisticated learning algorithms to large consumer data sets. Data mining enables marketers to reveal new consumer behavior hypotheses rather than simply test existing hypotheses. For example, data mining can reveal a hitherto unknown strong correlation between purchases of beer and disposable diapers among married men between 6 PM and 10 PM on weekdays. With such new knowledge at their disposal, marketers can develop marketing programs accordingly.

Armed with knowledge gleaned from the application of data mining algorithms to consumer data sets, marketers can target specific offerings to particular individuals described by a unique marketing profile. These targeted marketing efforts strike many as an invasion of privacy, so governments in the United States and abroad increasingly are restricting the uses to which individual marketing data can be put.

Unfortunately, conventional marketing systems are built around the capability to target individual consumers in the systems' marketing database. These conventional marketing systems by design thus do not shield personal consumer data from marketers. Moreover, conventional marketing systems are often built around databases containing old data, so offerings are sometimes targeted to individuals no longer described by the marketing profile. In addition, conventional marketing systems do not enable marketers to access marketing information on-line and/or do not accumulate data from on-line consumer activity. Conventional marketing systems, moreover, are focused on a few specific market segments (consumer packaged goods or pharmaceuticals, for example) and are therefore not useful to a broad range of businesses serving other market segments; forcing those businesses to rely on anecdotal market information or to perform costly market research on their own.

SUMMARY OF THE INVENTION

It is an object of the present invention to provide real-time marketing systems and associated methods for creating marketing profiles and for directing customized offers to consumers that are associated with the marketing profiles while preserving consumer privacy.

It is a further object of the present invention to provide marketing systems and associated methods for enabling marketers to frame real-time offers according to a marketing profile describing elements of class records and to then direct those offers to individual consumers.

It is still a further object of the present invention to provide marketing systems and associated methods for enabling marketers to take advantage of on-line consumer data collection.

It is still a further object of the present invention to provide marketing systems and associated methods for aggregating consumer behavior information, for abstracting from the aggregated consumer behavior information, for thereby enabling marketers to develop marketing programs, for determining which consumers should receive a targeted offering from a marketer in such a way that consumer identity is shielded from the marketer, for communicating such targeted offerings to particular consumers, and for learning from the consumers' response to the offering.

These and other objects are provided, according to an aspect of the present invention, by a marketing system for directing customized offers to consumers comprising a secure server that includes an individual records database derived from a consumer data set and first communications facilities to enable the secure server to communicate with individual consumers. The system further comprises a marketing server that includes a classes database derived from an abstraction of the individual records database and second communications facilities that provide access by marketers to the marketing server. The system further comprises a third communications facilities to enable the marketing server to communicate with the secure server. According to an embodiment of the invention, the secure server, in response to instructions received from the marketing server, communicates offers to individual consumers.

These and other objects are also provided, according to an aspect of the present invention, by a method of directing customized offers to consumers that comprises the steps of creating individual records in an individual records database by aggregating consumer data; generating class records in a classes database, where the class records generating step further comprises the steps of abstracting the individual records to create the class records and creating an index tracing the class records to the individual records, creating marketing profiles describing elements of the classes database in response to a request from a marketer, generating an offer to individual consumers in response to offer initiation by a marketer, and communicating the offer to individual consumers.

These and other objects are also provided, according to an aspect of the present invention, by a method of directing customized offers to consumers that comprises the steps of creating an individual records database including a plurality of individual records that describe consumer behavior, storing the individual records database on a secure server, abstracting the individual records of the individual records database to generate class records that are stored in a class records database, wherein the step of abstracting generates class records devoid of information identifying individual consumers, and wherein each of the class records is traceable to a corresponding individual record, identifying a subset of the class records associated with consumers to whom communications are to be directed based on a marketing profile submitted by a marketer, identifying a subset of individual records by tracing the subset of class records to individual records, and generating a communication to those consumers associated with the identified subset of individual records.

According to one advantageous embodiment of the invention, a marketing system is deployed on first and second servers. On the first server, the system preferably collects, cleans and organizes consumer data from a variety of data sources to create a database of individual consumer records. On the second server, the individual records are abstracted to create a database of consumer classes (such as classes according to income, zip code, or preferred web portal, for example). The classes are preferably traceable to the individual records only through a mapping function, such as an index that includes a search query, and the individual records are not accessible by users of the second server. Significantly, the classes database preferably may be updated at any time to provide fresh data to marketers.

Marketers using a system according to one advantageous embodiment of the present invention can develop marketing profiles describing a group of individuals with similar behavior characteristics (such as might indicate potential buyers of sports cars, for example) for querying the classes database. The system according to one advantageous embodiment then enables the marketer to initiate an electronic offer directly to a group of individual consumers without revealing the identity of any of the individual consumers to the marketer. Indeed, the marketer may not even know how many individuals the offer will be directed to. Individual consumers may respond to the offer through the system, anonymously with respect to the marketer, and response data is collected and used to update the consumer data.

The marketing systems and methods of the present invention thus overcome limitations inherent in prior marketing systems and methods by permitting marketers to communicate customized offers to freshly-qualified individual consumers electronically without revealing consumer identity to the marketer. Advantageously, the systems and methods may be useful to marketers in a broad range of industries, take advantage of on-line consumer data collection, and are available to marketers on-line. The systems and methods of the present invention therefore enable sophisticated direct-to-consumer marketing initiatives in a range of industries while preserving consumer privacy.

DETAILED DESCRIPTION OF THE INVENTION

The present invention will now be described more fully with reference to the accompanying drawings, in which preferred embodiments of the invention are shown. This invention may, however, be embodied in many different forms and should not be construed as limited to the embodiments set forth here; rather, these embodiments are provided so that this disclosure will be thorough and complete and will fully convey the scope of the invention to those skilled in the art. Like numbers refer to like elements throughout.

Figure 1:
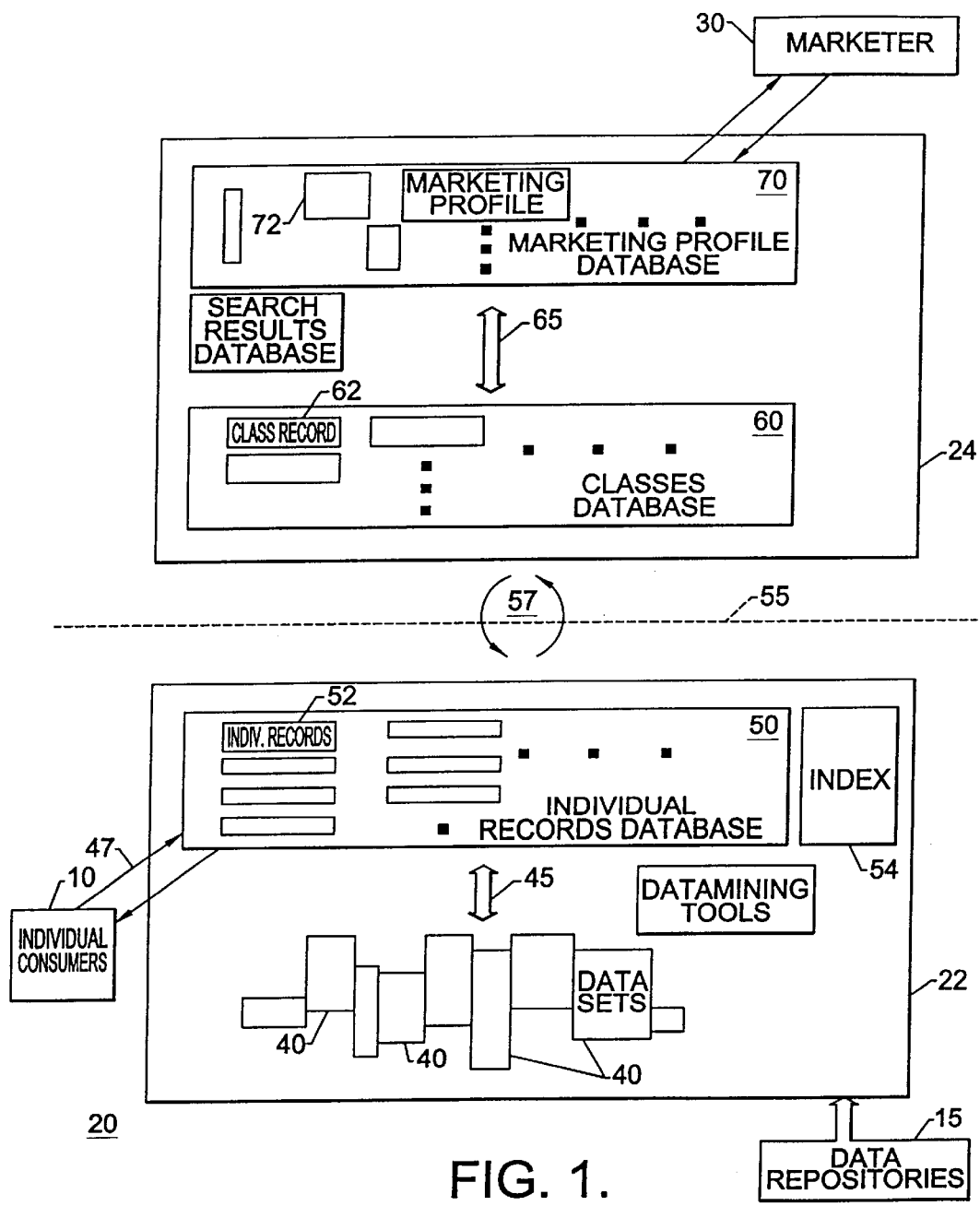
FIG. 1 is schematic block diagram of a marketing system according to one embodiment of the present invention.

A marketing system 20 according to one advantageous embodiment of the present invention is illustrated in FIG. 1. Consumer behavior data is preferably collected from many sources of consumer data sets, including from Internet-based electronic commerce and other consumer on-line activity and from records of consumer web browsing revealed through viewing cookie files installed on consumer computer hard drives. Repositories 15 of these disparate sets of consumer data preferably include those data repositories prepared by consumer data collection companies such ACNielsen of Stamford, Conn. and Information Resources, Inc. ("IRX") of Chicago, Ill. as well as many other third-party data repositories. Such repositories may, of course, include repositories created solely by or for the system of the present invention. While the data may be in many different formats and may include a variety of data elements, each data record preferably includes some data element that uniquely identifies an individual consumer 10. This unique identifier may comprise the consumer's name, phone number, email address or any other suitable identifier. The system 20 according to the present invention communicates through communications facilities with data repositories 15 in order to acquire and store disparate consumer data sets 40, such as data representing individual consumers' buying habits, web browsing history, or household income. Data records from disparate data sets 40 are cleaned, aggregated and abstracted to create uniformly-formatted individual records 52 in individual records database 50. Secure server 22 provides functions including repository acquisition and individual records creation, and also serves individual records database 50 to marketing server 24 through a security firewall 55, as is well known in the art. Secure server 22 includes communications facilities, such as an email module or other communications software module, for communicating with individual consumers 10 and with data repositories 15. Additional communications facilities included within the system 20 permit the marketing server 24 to communicate with the secure server 22.

One or more marketers 30 may access the system 20 through communications facilities at marketing server 24. A classes database 60, comprising consumer class records 62, is generated on the marketing server 24 by abstracting the individual records 52 in individual records database 50 served by secure server 22 via a communications link 57. The individual records 52 may be abstracted by removing individual consumer identification information. Class records could, for example, comprise consumer data sorted by zip code, income level, or preferred web portal. The class records 62 preferably do not include consumer identification information. The class records 62 are preferably traceable to individual records 52 only by means of an index 54 securely stored on the secure server 22, thus ensuring the privacy of individual consumers 10. Advantageously, the classes database 60 may be updated at any time or continuously to provide fresh data to the marketers 30.

Marketers 30 using the system 20 can create marketing profiles 72 in a marketing profiles database 70 for querying the classes database 60. Marketing profiles 72 could, for example, comprise likely mortgage refinance factors or likely pet bird purchase factors. In one advantageous embodiment, the marketing server 24 includes a search results database to store any number of specific, customized marketing profiles for subsequent reuse by each of several marketers 30. Once marketing profiles 72 have been created, marketers 30 may design customized marketing initiatives.

According to one advantageous embodiment of the present invention, the system 20 enables a marketer 30 to initiate an electronic offer from the secure server 22 directly to a group of individual consumers 10 without revealing the identity of any of the individual consumers to the marketer. In this regard, a marketer 30 requests that a specified offer be communicated through the system 20 to individual consumers 10 described by a particular marketing profile 72. The marketing server 24 provides the offer and the class records 62 described by the particular marketing profile 72 to secure server 22. Because the individual records 52 may be updated often, the class records 62 may be fresh.

To determine which individual consumers 10 the offer is to be directed to, the system 20 instructs secure server 22 to apply index 54 to the class records 62 in order to reconstruct the appropriate individual records 52. According to one advantageous embodiment, the system 20 then preferably communicates the offer to individual consumers 10 through a communications facility 47, such as via an electronic mail (e-mail) module. Alternatively, the communications facility 47 may comprise a web server that communicates the offer to an individual consumer 10 by serving a web page to the individual consumer in response to a browser hit by that consumer. Other communications mediums may be used for communicating the offer to the consumer as are known in the art without departing from the present invention.

In one advantageous embodiment, the system 20 enables consumers to respond to the offer via the communications facility 47, and the individual records database 50 is then preferably updated accordingly with response data. The consumer response is preferably also forwarded by the system 20 to the marketer 30 that initiated the offer for order fulfillment or offer revision after removing consumer identification information with the same system logic used to generate consumer class records 62 from individual records 52 as described above. Preferably, the system 20 enables the marketer to update class records 62 by re-querying individual records database 50, which is preferably continuously or periodically updated with consumer responses to offers and with new data from the data repositories 15.

In another advantageous embodiment of the present invention, the marketing server 22 includes software for applying data mining tools or algorithms to the individual records database 50 in order to reveal new consumer behavior patterns to marketers. Data mining tools are available from several vendors, including Angoss, Business Objects, DataMind, IBM, Integral Solutions, Magnify, Pilot Software, SAS, Silicon Graphics, and Thinking Machines. Marketers may thereby tailor marketing initiatives to individual consumers according to the knowledge gleaned from applying data mining tools to individual records database 50.

Figure 2:
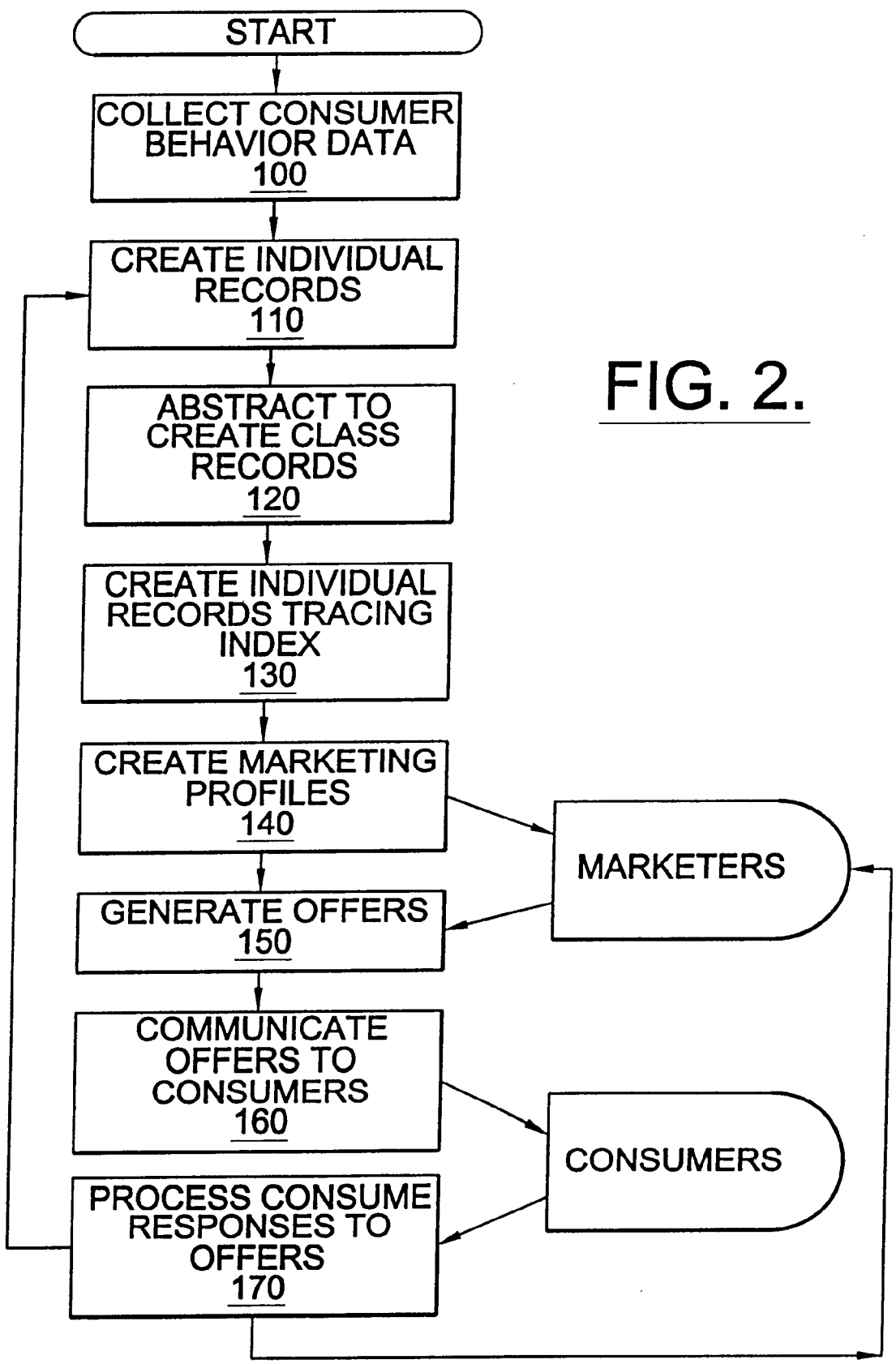
FIG. 2 is a flow diagram indicating the steps in a marketing method according to one embodiment of the present invention.

A flow diagram of a marketing method according to one advantageous embodiment of the present invention is provided in FIG. 2. According to this embodiment, the method includes the steps of collecting consumer behavior data as indicated by block 100, creating individual records as indicated by block 110, abstracting the individual records to create class records as indicated by block 120, and creating an index to trace class records to individual records as indicated by block 130. Marketers create marketing profiles describing class records and authorize offers to consumers, as indicated by block 140. Offers to particular consumers are generated, as indicated by block 150, and communicated to consumers, as indicated by block 160, and consumer responses to offers are processed as indicated by block 100 and provided to the marketers and used to update individual records.

Figure 3:
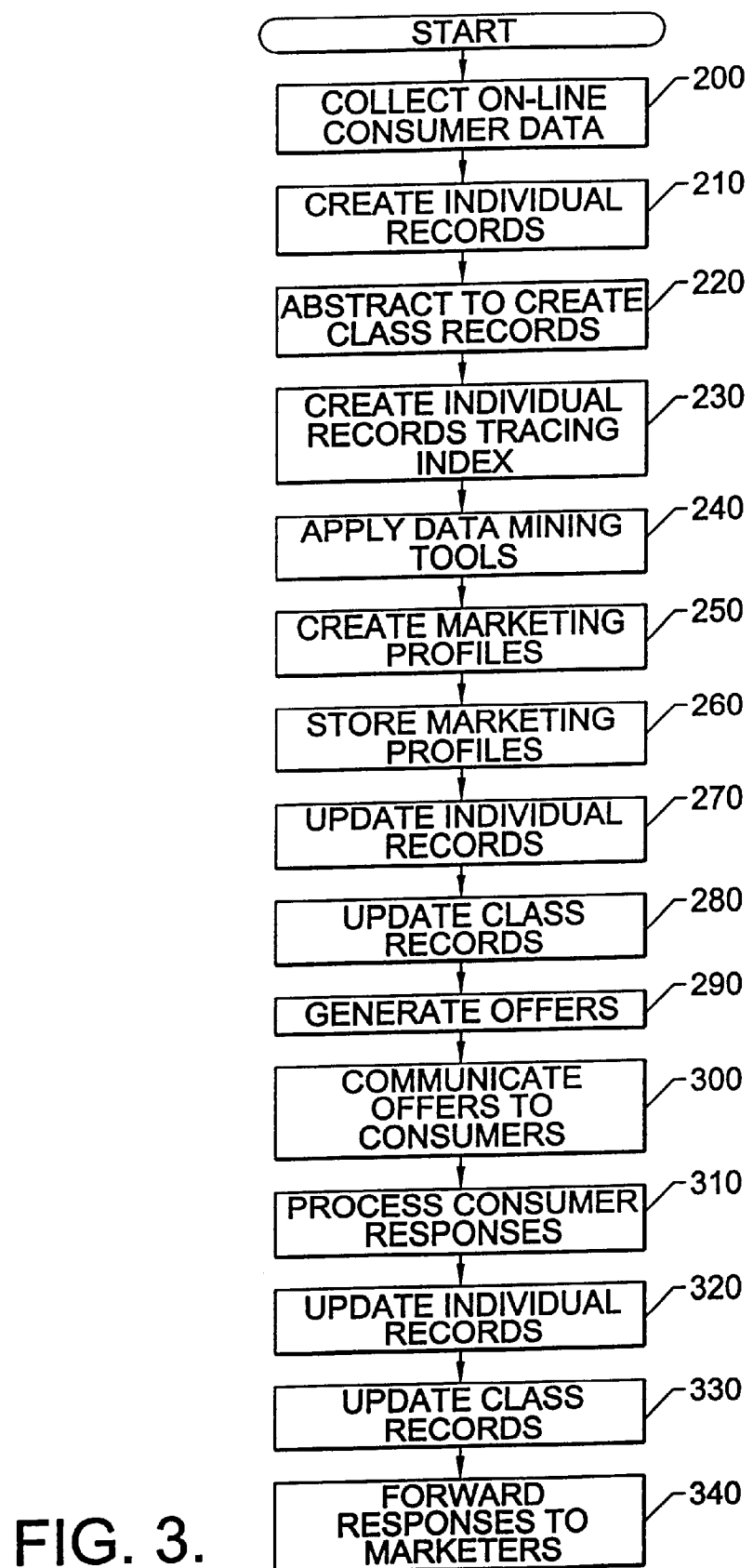
FIG. 3 is a flow diagram indicating the steps in a marketing method according to one embodiment of the present invention.

A flow diagram of another marketing method according to another advantageous embodiment of the present invention is provided in FIG. 3. According to this embodiment, the method provides for directing customized offers to consumers that includes the steps of collecting consumer data from at least one on-line data repository as indicated by block 200, the consumer data including a consumer identifier; creating individual records, as indicated by block 210; abstracting the individual records to create class records, as indicated by block 220; creating an index to trace class records to individual records, as indicated by block 230; using data mining tools to help marketers frame their requests, as indicated by block 240; creating marketing profiles in response to marketer requests, as indicated by block 250; storing marketing profiles in a search results database, as indicated by block 260; updating individual records and class records in response to a marketer request and as additional consumer behavior data is aggregated, as indicated by blocks 270 and 280, respectively; generating offers to individual consumers, as indicated by block 290; communicating offers to individual consumers, as indicated by block 300; processing consumer responses to the offer, as indicated by block 310; updating individual records and class records in response to a marketer request and as consumer responses to the offer are processed, as indicated by blocks 320 and 330, respectively; and forwarding consumer responses to marketers, as indicated by block 340. According to this embodiment, the index creating step comprises creating an index tracing the class records to the individual records, wherein the index is not accessible by the classes database, and the communicating step comprises communicating the offer electronically to individual consumers.

Marketers using the system 20 preferably access the system 20 via a web browser application or other thin client application across the Internet, an extranet, a virtual private network, or other network as is known to those skilled in the art. The marketer 30 may initiate a search in the system 20 according to a marketing profile. If an identical search has been performed recently by the system, the recent results may be used; if no identical search has been performed recently, a new search is performed by the system. The search results are preferably stored in a database for real-time or subsequent access by the marketer.

In one advantageous embodiment, the marketing system 20 accesses data from a wide range of data repositories 15, across multiple lifestyle and e-commerce categories, to ensure rich and in-depth consumer profiles. Such data repositories might, for example, include e-commerce sites (e.g., Amazon.com or CDnow), aggregator sites (e.g., Yahoo or CompareNet), hub/community sites (e.g., GeoCities, iMalls, or iVillage), or special interest sites (e.g., GolfWeb or WebMD).

According to one advantageous embodiment of the present invention, two-way communications between the marketer 30 and individual consumers 10 is provided by the marketing system 20. According to this embodiment, a marketer can establish communication with individual online consumers Io by way of the system even though the marketer has no knowledge of the identity of any particular consumer. The key to this aspect of the invention is the creation of class records 62 by way of accessing and processing individual records 52, then removing individual consumer identifying information via an index 54, and then associating that index with the class records so that the consumer identifying information may be reconstructed later. The class records 62 are then forwarded to the marketer for processing, such as offer generation. When the marketer wishes to communicate back to members of the class or to particular groups (profiles) within the class, the index 54 is invoked within secure server 22 to identify a method of communication allowed by that consumer. The method of communication may be a non-push method, such as creation of a web page for that consumer. Alternatively, the method of contact may be a push method, such as an e-mail message, if the consumer has provided permission for the marketer to generate such a message.

One advantage according to the aforementioned advantageous embodiment is that it allows the system to take advantage of the fact that profiles of individuals may change frequently. It has been shown through on-line research that individual profiles could change within hours. For example, while a recent query to the data repositories 15 may have provided a list of 5,231 people with a particular profile, the number of people who now fit that profile may be 7,156 or 3,459. This advantageous embodiment of the invention enables the system to direct communications to a set of consumers that has been collected at or very near the time of communication.

The marketing systems and methods of the present invention thus permit marketers to communicate customized offers to freshly-qualified individual consumers without revealing consumer identity to the marketer. Advantageously, the systems and methods according to one embodiment of the present invention are useful to marketers in a broad range of industries, take advantage of on-line consumer data collection, and are available to marketers on-line. The systems and methods therefore enable sophisticated direct-to-consumer marketing initiatives while preserving consumer privacy.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the invention. Although specific terms are employed herein, they are used in a generic and descriptive sense only and not for purposes of limitation.

That which is claimed is:

1. A computer-based marketing system for directing customized offers to consumers, the marketing system comprising:
 a secure server comprising:
  an individual records database of individual records derived from a consumer data set; and
  a first communications facility that enables the secure server to communication offers with individual consumers;
 a marketing server in communication with the secure server, comprising:
  a classes database of class records derived from an abstraction of the individual records database, wherein said classes database identifies individual records of said individual records database to which electronic offers are to be sent based on a user-selected marketing profile, and
   the said class records are devoid of information specifying the identify of the consumers associated with the class records; and
  a second communication facility that provides access by marketers to the marketing server; and
  a third communications facilities that enables the marketing server to communication with the secure server;
  wherein the secure server, in response to instructions received from the marketing server, communicates offers to individual consumers.

2. The computer-based marketing system according to claim 1 wherein the consumer data set comprises data collected from on-line consumer activity.

3. The computer-based marketing system according to claim 1 further comprising a search results database to store marketing profiles.

4. The computer-based marketing system according to claim 1 wherein the secure server is adapted to receive responses to the offers from consumers.

5. The computer-based marketing system according to claim 1 wherein the secure server includes software for applying data mining tools to the individual records database.

6. The computer-based marketing system according to claim 1 further comprising an index that traces class records in the classes database to individual records in the individual records database.

7. A computer-based marketing system for directing customized offers to consumers while preserving consumer privacy, the marketing system comprising:
 a secure server comprising:
  a first communications facility that communicates with a consumer data set derived from consumer data;
  an individual records database of individual records derived from the consumer data set; and
  a second communications facility that enables the secure server to communicate with individual consumers;
 a marketing server in communication with the secure server comprising:

a classes database of class records derived from an abstraction of the individual records database, wherein said classes database identifies individual records of said individual records database to which electronic offers are to be sent based on a user-selected marketing profile;

marketing profiles describing elements of the classes database; and a third communications facility that provides access by marketers to the marketing server, and a fourth communications facility that enables the marketing server to communicate with the secure server;

wherein the secure server, in response to instructions received from the marketing server, communicates offers to individual consumers; and wherein information identifying individual consumers is shielded from the marketing server and from marketers by the secure server.

8. The computer-based marketing system according to claim 7 wherein the data repositories comprise third-party data repositories.

9. The computer-based marketing system according to claim 7 wherein the consumer data set comprises data collected from on-line consumer activity.

10. The computer-based marketing system according to claim 7 further comprising an index that traces class records in the classes database to individual records in the individual records database.

11. The computer-based marketing system according to claim 7 wherein the secure server includes software for applying data mining tools to the individual records database.

12. The computer-based marketing system according to claim 7 wherein the secure server receives responses from consumers.

13. A method of directing customized offers to consumers, the method comprising the steps of:

creating individual records in an individual records database by aggregating consumer data;

generating class records in a classes database, the class records generating step comprising the steps of:

abstracting the individual records to create class records;

creating an index tracing the class records to the individual records wherein the index is not accessible by the classes database;

creating marketing profiles describing elements of the classes database in response to a request from a marketer;

generating an offer to individual consumers in response to offer initiation by a marketer; and communicating the offer to individual consumers.

14. The method of directing customized offers to consumers according to claim 13 further comprising the step of processing consumer responses to the offer.

15. The method of directing customized offers to consumers according to claim 14 further comprising the step of updating individual records and class records as consumer responses to the offer are processed.

16. The method of directing customized offers to consumers according to claim 14 further comprising the step of updating individual records and class records in response to a marketer request and as consumer responses to the offer are processed.

17. The method of directing customized offers to consumers according to claim 13 wherein the communicating step comprises communicating the offer electronically to individual consumers.

18. The method of directing customized offers to consumers according to claim 13 wherein the communicating step comprises communicating the offer electronically to individual consumers via an electronic mail message.

19. The method of directing customized offers to consumers according to claim 18 wherein the communicating step comprises communicating the offer electronically to individual consumers by serving a web page.

20. The method of directing customized offers to consumers according to claim 13 further comprising the step of collecting consumer data from at least one data repository, the consumer data including a consumer identifier.

21. The method of directing customized offers to consumers according to claim 20 wherein the consumer data collecting step comprises collecting consumer data from at least one on-line data repository.

22. The method of directing customized offers to consumers according to claim 13 further comprising the step of storing marketing profiles in a search results database.

23. The method of directing customized offers to consumers according to claim 13 further comprising the step of using data mining tools to help marketers frame their requests.

24. The method of directing customized offers to consumers according to claim 13 further comprising the step of updating individual records and class records as additional consumer behavior data is obtained.

25. The method of directing customized offers to consumers according to claim 13 further comprising the step of forwarding offer responses from individual consumers to the marketer.

26. The method of directing customized offers to consumers according to claim 13 further comprising the step of updating individual records and class records in response to a marketer request and as additional consumer behavior data is aggregated.

27. The method of directing customized offers to consumers according to claim 13 further comprising the steps of collecting consumer data from at least one on-line data repository, the consumer data including a consumer identifier;

using data mining tools to help marketers frame their requests;

storing marketing profiles in a search results database;

updating individual records and class records in response to a marketer request and as additional consumer behavior data is aggregated;

processing consumer responses to the offer;

updating individual records and class records in response to a marketer request and as consumer responses to the offer are processed; and forwarding consumer responses to marketers;

wherein the index creating step comprises creating an index tracing the class records to the individual records, wherein the index is not accessible by the classes database; and wherein the communicating step comprises communicating the offer electronically to individual consumers.

28. A method of directing customized offers to consumer, the method comprising the steps of:

creating an individual records database including a plurality of individual records that describe consumer behavior;

storing the individual records database on a secure server;

abstracting in the secure server the individual records in the individual records database to generate class records that are stored in a class records database on a marketing server, wherein the step of abstracting generates class records devoid of information identifying individual consumers, and wherein each of the class records is traceable to a corresponding individual record;

identifying in the marketing server a subset of individual records associated with consumers to whom communications are to be directed based on a marketing profile submitted by a marketer;

identifying in the secure server a subset of individual records by tracing the subset of class records to individual records; and generating in the secure server a communication to those consumers who are associated with the identified subset of individual records.

29. The method of directing customized offers to consumers according claim 28 further comprising the step of forwarding offer responses from individual consumers to the marketer.

30. A computer-based marketing system for directing customized offers to consumers, the marketing system comprising:

means for organizing an individual records database containing individual records from a variety of consumer data sources;

means for generating class records in a classes database, the class records generating means further comprising means for abstracting the individual records to create class records;

means for creating a marketing profile describing elements of the classes database in response to a request from a marketer; and means for generating offers to individual consumers described by the marketing profile in response to offer initiation by a marketer;

wherein the abstracting means eliminates all individual consumer identifying information from the class records in order to preserve consumer privacy.

31. The computer-based marketing system according to claim 30 further comprising means for accessing a plurality of consumer data sources.

32. The computer-based marketing system according to claim 30 further comprising means for communicating with individual consumers.

33. The computer-based marketing system according to claim 30 further comprising means for communicating with the marketer.

34. The computer-based marketing system according to claim 30 further comprising means for applying data mining tools to the individual records database.

35. The computer-based marketing system according to claim 30 further comprising means for indexing the class records to the individual records, wherein the indexing means is not accessible by the marketer.

36. The computer-based marketing system according to claim 30 further comprising means for forwarding offer responses from individual consumers to the marketer.

37. A computer program product for directing customized offers to consumers, the computer program product comprising:

a computer-readable storage medium having computer-readable program code means embodied in said medium, said computer-readable program code means comprising:

computer readable program code means for organizing an individual records database containing individual records from a variety of consumer data sources;

computer readable program code means for generating class records in a classes database, the class records generating means further comprising means for abstracting the individual records to create class records;

computer readable program code means for creating a marketing profile describing elements of the classes database in response to a request from a marketer; and computer readable program code means for generating offers to individual consumers described by the marketing profile in response to offer initiation by a marketer, wherein the computer readable program code abstracting means eliminates al individual consumer identifying information from the class records in order to preserve consumer privacy.

* * * * *